(12) United States Patent
Oem et al.

(10) Patent No.: US 10,055,077 B2
(45) Date of Patent: Aug. 21, 2018

(54) TOUCH PANEL FOR IMPROVING CROSS STRUCTURE OF SENSING PATTERN

(71) Applicant: LG INNOTEK CO., LTD., Seoul (KR)

(72) Inventors: Seongsu Oem, Seoul (KR); Young Sun You, Seoul (KR); Sun Hwa Lee, Seoul (KR); Kwang Yong Jin, Seoul (KR); Yongjae Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 29 days.

(21) Appl. No.: 15/300,895

(22) PCT Filed: Oct. 15, 2014

(86) PCT No.: PCT/KR2014/009657
§ 371 (c)(1),
(2) Date: Sep. 30, 2016

(87) PCT Pub. No.: WO2015/152479
PCT Pub. Date: Oct. 8, 2015

(65) Prior Publication Data
US 2017/0024042 A1    Jan. 26, 2017

(30) Foreign Application Priority Data

Mar. 31, 2014 (KR) .................. 10-2014-0038133

(51) Int. Cl.
*G06F 3/045* (2006.01)
*G06F 3/044* (2006.01)
*G06F 3/046* (2006.01)

(52) U.S. Cl.
CPC .............. *G06F 3/044* (2013.01); *G06F 3/045* (2013.01); *G06F 3/046* (2013.01);
(Continued)

(58) Field of Classification Search
CPC .................................. G06F 3/044; G06F 3/046
(Continued)

(56) References Cited

U.S. PATENT DOCUMENTS

| | | | | |
|---|---|---|---|---|
| 2004/0056355 A1* | 3/2004 | Minami | .............. | H01L 23/5286 257/758 |
| 2004/0189587 A1* | 9/2004 | Jung | .................. | G02F 1/13338 345/102 |

(Continued)

FOREIGN PATENT DOCUMENTS

| | | |
|---|---|---|
| CN | 203217549 | 9/2013 |
| EP | 2 267 587 | 12/2010 |

(Continued)

OTHER PUBLICATIONS

International Search Report and Written Opinion dated Jan. 15, 2015 issued in Application No. PCT/KR2014/009657.

(Continued)

*Primary Examiner* — Yuzhen Shen
(74) *Attorney, Agent, or Firm* — KED & Associates, LLP

(57) ABSTRACT

The present invention relates to a touch panel having pen touch and electrode touch functions. Specifically, the present invention relates to a touch panel, which can enhance visibility of a view area and simplify the process of manufacturing the touch panel by improving wiring of sensing patterns for pen touch and arranging overlap structures, which are created as the sensing patterns cross each other, in a separate area other than the view area.

10 Claims, 5 Drawing Sheets

(52) U.S. Cl.
CPC ............. *G06F 2203/04103* (2013.01); *G06F 2203/04106* (2013.01); *G06F 2203/04111* (2013.01); *G06F 2203/04112* (2013.01)

(58) Field of Classification Search
USPC ......................................................... 345/174
See application file for complete search history.

(56) References Cited

U.S. PATENT DOCUMENTS

| | | |
|---|---|---|
| 2008/0312867 A1 | 12/2008 | Chen et al. |
| 2009/0207150 A1 | 8/2009 | Obi et al. |
| 2011/0227588 A1 | 9/2011 | Chen et al. |
| 2012/0299638 A1 | 11/2012 | Han |
| 2013/0021296 A1 | 1/2013 | Min et al. |
| 2013/0113752 A1 | 5/2013 | Chang et al. |
| 2014/0022187 A1* | 1/2014 | Jeong ...................... G06F 3/046 345/173 |
| 2014/0028599 A1 | 1/2014 | Jeong |
| 2015/0084907 A1* | 3/2015 | Burberry ................. G06F 3/046 345/174 |
| 2015/0220192 A1* | 8/2015 | Jeon ......................... G06F 3/046 345/174 |
| 2015/0253915 A1* | 9/2015 | Hoang ................... G06F 3/0412 345/173 |
| 2016/0041677 A1* | 2/2016 | Tahara .................. G06F 3/0416 345/174 |
| 2016/0179266 A1* | 6/2016 | Yang ....................... G06F 3/044 345/174 |

FOREIGN PATENT DOCUMENTS

| | | |
|---|---|---|
| EP | 2 687 963 | 1/2014 |
| KR | 10-2011-0109788 | 10/2011 |
| KR | 10-2012-0012005 | 2/2012 |
| KR | 10-2013-0051356 | 5/2013 |
| KR | 10-2013-0108930 | 10/2013 |
| TW | M469544 U | 1/2014 |
| WO | WO 2013/056487 | 4/2013 |
| WO | WO 2013/066632 | 5/2013 |
| WO | WO 2013/147474 | 10/2013 |

OTHER PUBLICATIONS

Taiwanese Office Action dated Aug. 22, 2016 issued in Application No. 103139626.
Extended European Search Report dated Oct. 17, 2017 issued in Application No. 14888412.5.

* cited by examiner

[Fig. 1]
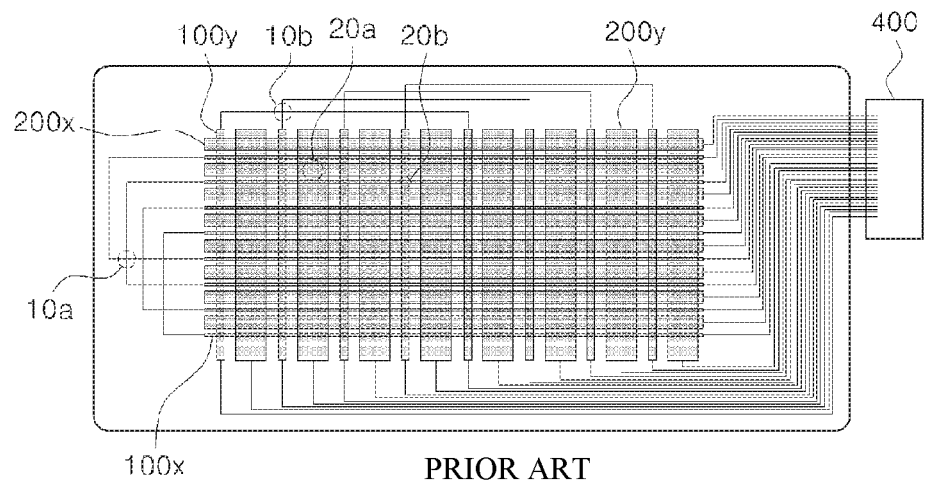
PRIOR ART
[Fig. 2]
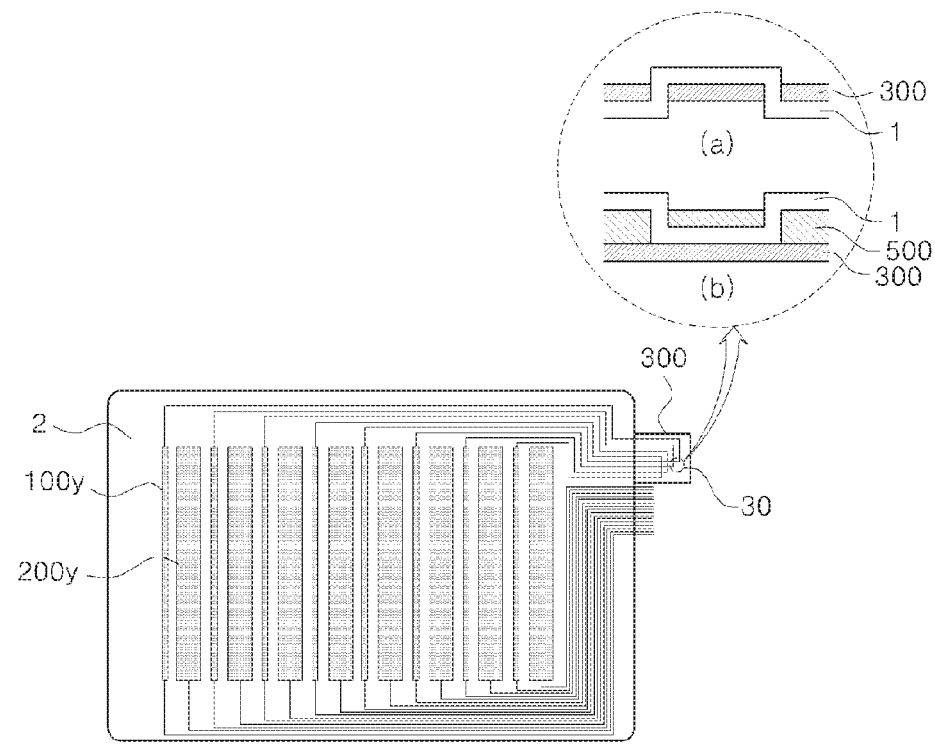

[Fig. 3]
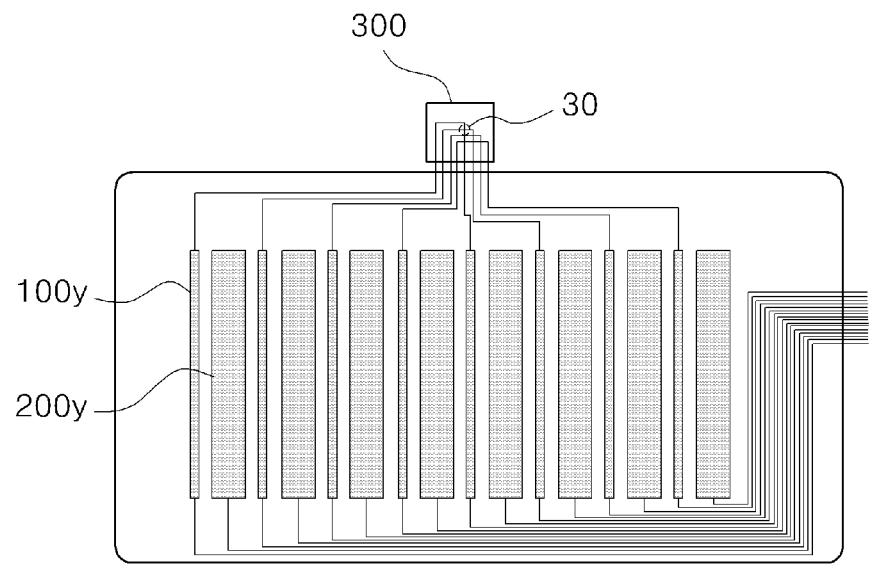
[Fig. 4]
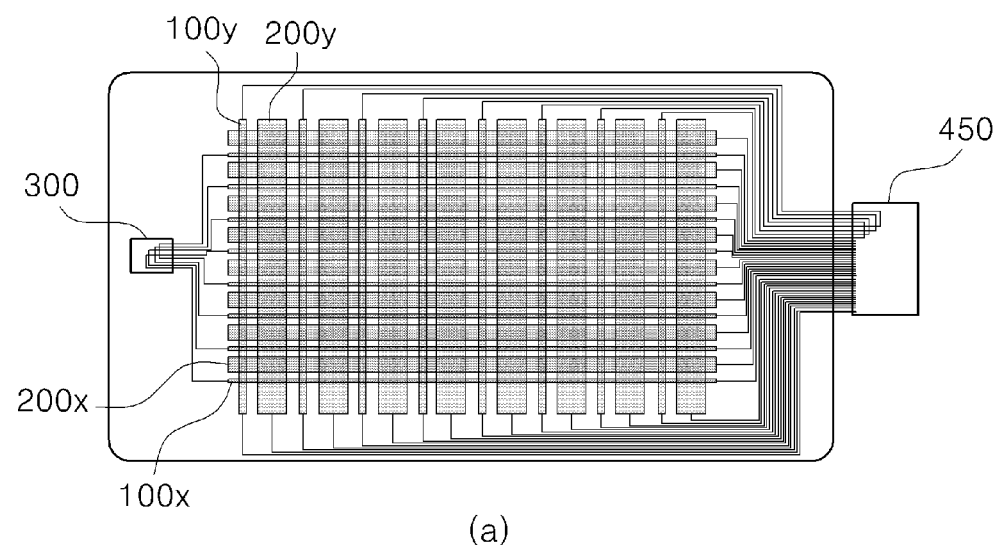
(a)
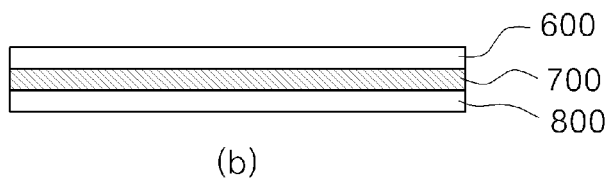
(b)

[Fig. 5]
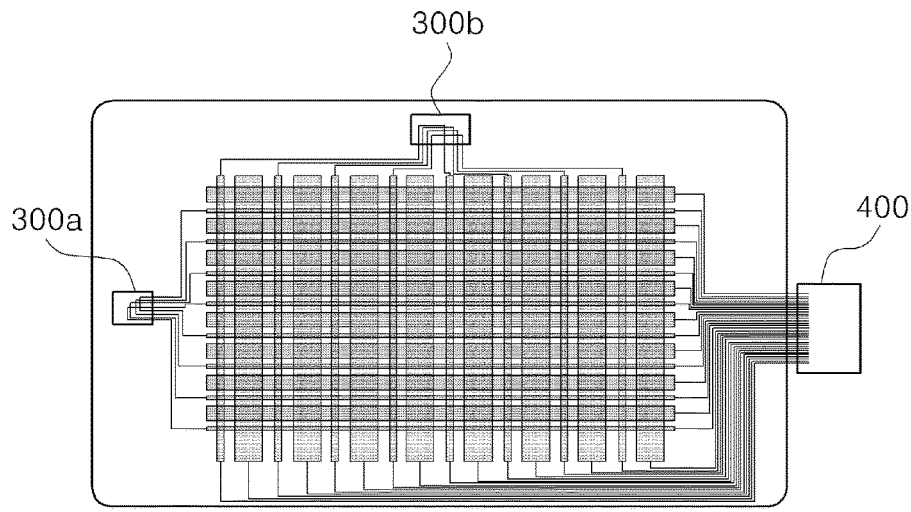
[Fig. 6]
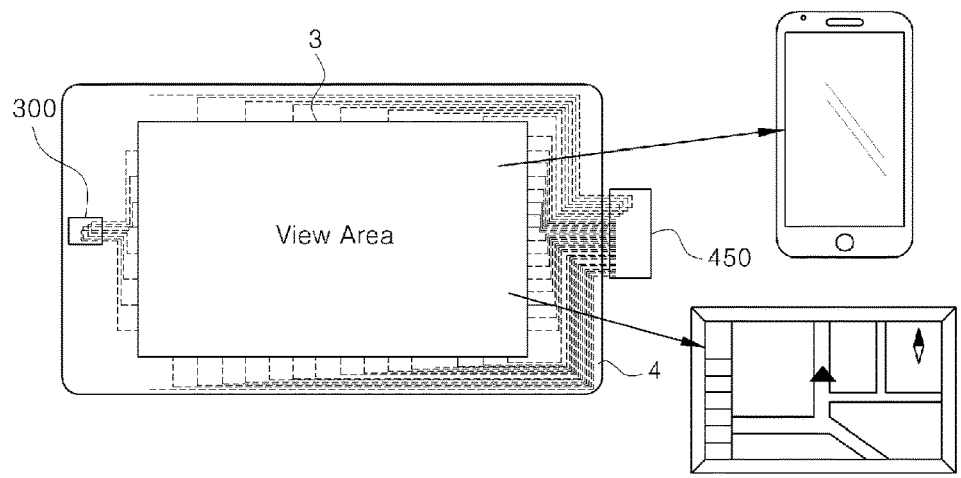
[Fig. 7]
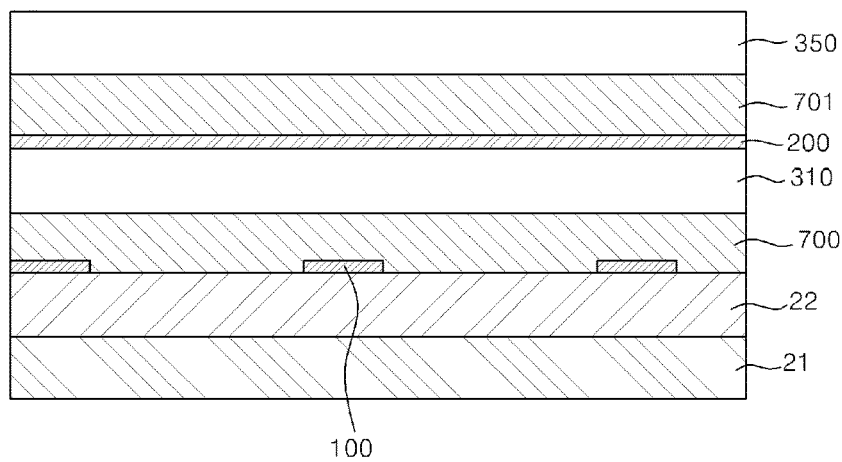

[Fig. 8]
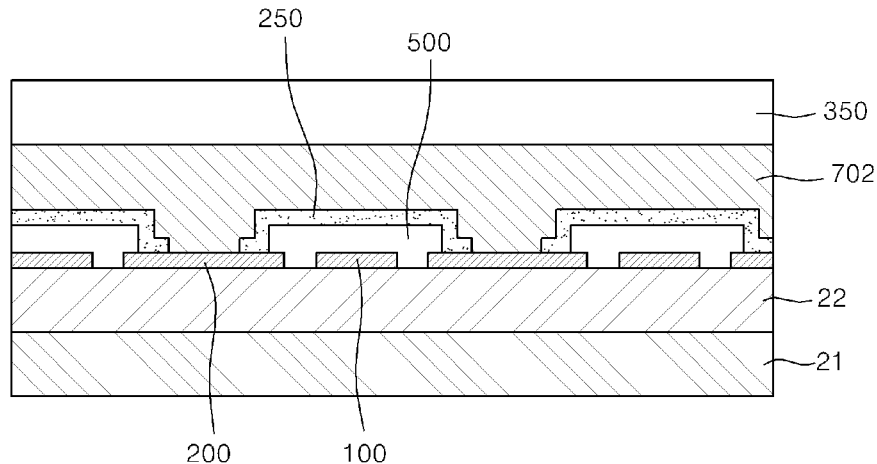
[Fig. 9]
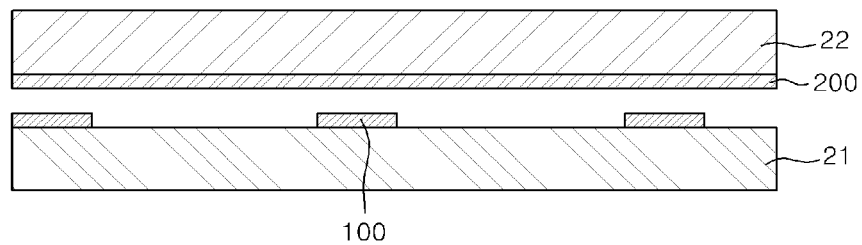
[Fig. 10]
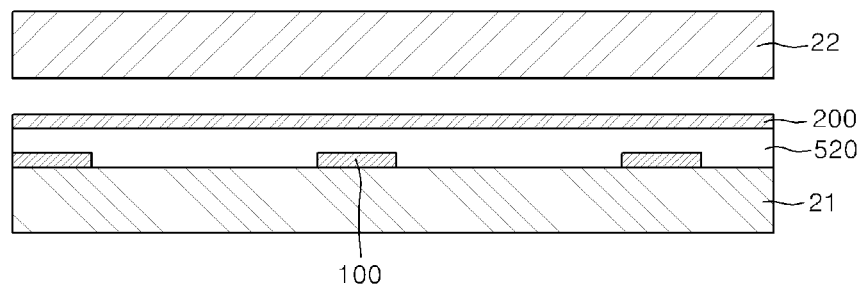
[Fig. 11]
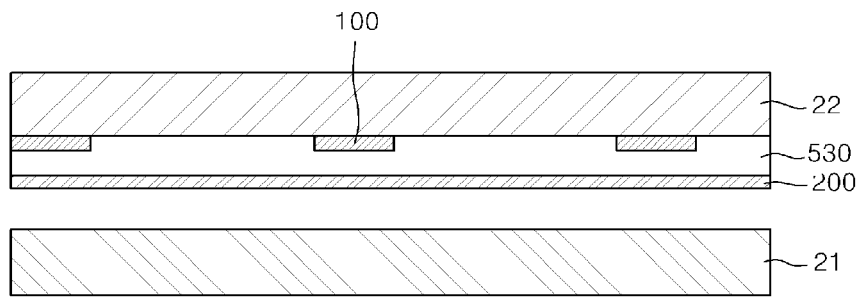

[Fig. 12]
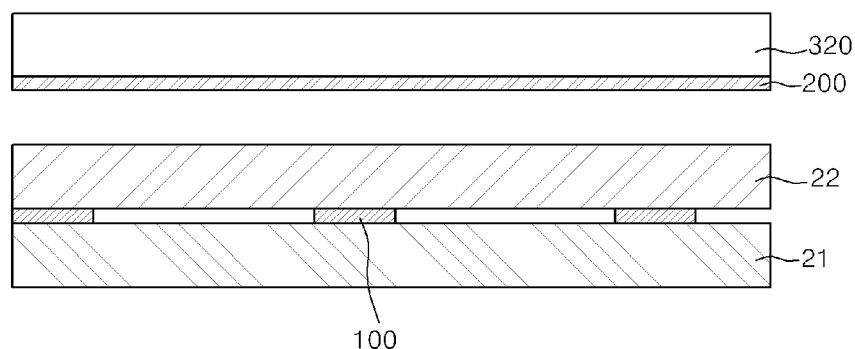

TOUCH PANEL FOR IMPROVING CROSS STRUCTURE OF SENSING PATTERN

CROSS-REFERENCE TO RELATED PATENT APPLICATIONS

This application is a U.S. National Stage Application under 35 U.S.C. § 371 of PCT Application No. PCT/KR2014/009657, filed Oct. 15, 2014, which claims priority to Korean Patent Application No. 10-2014-0038133, filed Mar. 31, 2014, whose entire disclosures are hereby incorporated by reference.

TECHNICAL FIELD

The present invention relates to a touch panel having pen touch and electrode touch functions. Specifically, the present invention relates to a touch panel, which can enhance visibility of a view area and simplify the process of manufacturing the touch panel by improving wiring of sensing patterns for pen touch and arranging overlap structures, which are created as the sensing patterns cross each other, in a separate area other than the view area.

BACKGROUND ART

Products of smartphones and tablet computers combining a capacitive touch function driven by sensing static electricity generated from the body of a user and a pen touch function driven by using an induced current generated by an induced electromagnetic force radiated from a touch pen are spotlighted recently.

Meanwhile, in order to implement both the capacitive touch function and the pen touch function using an induced electromagnetic force, getting out of a conventional structure of stacking a capacitive pattern layer for capacitive touch (hereinafter, referred to as a capacitive pattern) and an electromagnetic force sensing pattern for sensing induced electromagnetic force (hereinafter, referred to as a sensing pattern), a structure implementing both the capacitive pattern and the sensing pattern on one layer is actively utilized recently.

However, when the capacitive pattern and the sensing pattern are implemented on one layer like this, a jumping pattern, a cross structure or an overlap structure in which a plurality of patterns cross each other is inevitably created. Particularly, if a plurality of overlap structures exists in a view area, a problem of reduction in visibility is invited, and, in addition, a process performed when a panel is manufactured becomes more complicated, and thus it is disadvantageous in time, cost and throughput. Accordingly, in order to solve these problems, it is required to provide a new solution for excluding the overlap structures from the view area.

The present invention has been conceived from the limitations of a touch panel device or a touch panel manufacturing method described above, and a touch panel is proposed to enhance visibility of a display and simplify the process of manufacturing the touch panel by improving wiring of sensing patterns for pen touch and arranging overlap structures, which are created when the sensing patterns cross each other, in a separate area other than a view area.

As a related prior technique, there is Korean Laid-opened Patent No. 2013-0108930 ("Tablet having line antenna of improved structure"). The above prior technique proposes a methodology capable of minimizing cross structures, in addition to appropriately dividing a space occupied by a line antenna to be input in a line selection circuit, in an outer portion of a loop antenna which can determine positions of an electronic pen.

Although the invention of this application is similar to the prior technique in that a touch panel is improved in structure and manufacturing process by changing arrangement of sensing patterns or a line antenna, the prior technique is different from the present invention in that it is not a structure implementing capacitive patterns and sensing patterns on a single layer, and, in addition, according to the prior technique, cross pattern structures are not excluded from the view area completely.

DISCLOSURE OF INVENTION

Technical Problem

Therefore, the present invention has been made in view of the above problems, and it is an object of the present invention to provide a touch panel, in which sensing patterns implemented in one layer in the prior art are implemented in two layers.

In addition, the present invention provides a touch panel, in which wiring of sensing patterns on a substrate is improved, and an overlap structure formed between the sensing patterns is arranged in a separate area other than a view area.

In addition, the present invention provides a touch panel, in which resistance in sensing a current can be reduced by implementing sensing patterns to have a minimized length, and, furthermore, a gain in the bezel area can be obtained by reducing the number or wires of the sensing patterns.

Solution to Problem

The present invention provides a touch panel which improves overlap structures of sensing patterns as a means for solving the objects described above. However, categories of the present invention are not limited by the words themselves and can be diversely and extensively interpreted within a range including the spirits of the present invention described below.

According to one aspect of the present invention, a touch panel includes: a plurality of sensing patterns formed on a substrate to sense a touch signal; and an overlap area which is a certain area on the substrate or out of the substrate, in which the plurality of sensing patterns crosses each other, wherein the plurality of sensing patterns is insulated and crosses each other only in the overlap area.

In addition, an overlap substrate may be formed in the overlap area of the touch panel, and the plurality of sensing patterns may be insulated and cross each other through via holes formed in the overlap substrate.

As another method, an overlap substrate on which an insulation layer is stacked may be formed in the overlap area of the touch panel, and the plurality of sensing patterns may be insulated and cross each other through the insulation layer.

On the other hand, in the touch panel, the overlap substrate may be implemented as an FPCB.

On still the other hand, in the touch panel, the plurality of sensing patterns is formed in a shape surrounding capacitive patterns, and the overlap area is formed in an outer area of the substrate.

At this point, the plurality of sensing patterns may be formed using a material the same as that of a resistive film pattern or the capacitive patterns.

In addition, in the touch panel, the plurality of sensing patterns may be formed in a shape of a mesh.

Advantageous Effects of Invention

According to the present invention, since sensing patterns implemented only in one layer in the prior art is implemented to be separated onto two layers, an effect of reducing processing cost and enhancing processing throughput can be obtained.

In addition, according to the present invention, since a substrate of a different type can be used, getting out of the restriction of the prior art of implementing a pattern only on a glass substrate when the pattern is manufactured on one layer, an effect of enhancing freedom of selecting a substrate can be obtained.

In addition, according to the present invention, resistance of a wire of a sensing pattern can be lowered by reducing length of the wire, and, at the same time, an effect of reducing a bezel area can be obtained by reducing the number of wires.

In addition, according to the present invention, an effect of improving visibility of a display can be obtained by excluding an overlap structure from a view area.

BRIEF DESCRIPTION OF DRAWINGS

FIG. 1 is a view showing an example of implementing a capacitive pattern and a sensing pattern of the prior art.

FIG. 2 is a view showing an example of implementing a single layer of a capacitive pattern and a sensing pattern according to an embodiment of the present invention.

FIG. 3 is a view showing an example of implementing a capacitive pattern and a sensing pattern in a different form of the present invention.

FIG. 4 is a view showing an example of implementing a capacitive pattern and a sensing pattern of two layers according to an embodiment of the present invention.

FIG. 5 is a view showing an example of implementing a capacitive pattern and a sensing pattern of two layers in a different form of the present invention.

FIG. 6 is a view showing an example of implementing the touch panel of the present invention on a display device.

FIG. 7 to FIG. 12 are views showing an example of various touch displays which touch panel of the present invention is implemented

DESCRIPTION OF SYMBOLS

1: Wire
2: Base substrate 21, 22: Substrate
3: View area 4: Bezel area
10a, 10b: Cross structure by wire
20a, 20b: Cross structure by pattern
30: Cross structure by wire in overlap area
100x, 100y: Sensing pattern
200x, 200y: Capacitive pattern
250: Bridge electrode
300: Overlap substrate 310, 320: Touch substrate
350: Cover substrate
400: Driving substrate 450: Integrated substrate
500, 520, 530: Insulation layer
600, 800: First layers, second layers
700, 701, 702: Adhesive layer

MODE FOR THE INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

The embodiments disclosed in this specification should not be interpreted or used to limit the scope of the present invention. It is natural to those skilled in the art that descriptions including the embodiments of the present invention have a variety of applications. Accordingly, certain embodiments specified in the detailed descriptions of the present invention are merely provided for illustrative purposes for better explanation of the present invention and are not intended to limit the scope of the present invention to the embodiments.

The terms of the functions shown in the figures and described below are only examples of possible expressions. In other embodiments, other terms may be used without departing from the spirit and scope of the detailed descriptions.

In addition, an expression of including a constitutional element is an "open" expression, which simply refers to existence of a corresponding constitutional element, and it should not be understood to exclude additional constitutional elements.

In addition, the meaning of forming a layer (film), an area, a pattern or a structure "on" or "under" a substrate, a layer (film), an area, a pad or a pattern includes forming directly on the substrate, the layer (film), the area, the pad or the pattern or forming with the intervention of another layer.

Furthermore, when a constitutional element is mentioned to be "connected" or "coupled" to another constitutional element, although it may be directly connected or coupled to the another constitutional element, it should be understood that still another constitutional element may exist therebetween.

In addition, the terms such as "first", "second" and the like may be used to describe various constitutional elements, the constitutional elements should not be limited by the terms, and the terms are used only to distinguish one constitutional element from the other constitutional elements.

FIG. 1 is a view showing an example of implementing a touch panel of the prior art.

As described above, interest in touch panels having both a capacitive pattern 200 capable of sensing static electricity generated from the body of a user and a sensing pattern 100 capable of sensing an induced electromagnetic force generated by a touch pen is increasing recently. FIG. 1 is a view showing a capacitive pattern 200 and a sensing pattern 100 provided in a touch panel, and this is an embodiment widely used until present.

According to FIG. 1, first of all, it can be confirmed that both the capacitive pattern 200 and the sensing pattern 100 are arranged on a layer. Specifically, if it is assumed as shown in FIG. 1 that the horizontal direction is the X-axis direction and the vertical direction is the Y-axis direction, wiring of patterns on each axis is implemented to overlap the patterns with each other on a substrate, and, accordingly, structures 10 and 20 of crossing patterns or wires are inevitably created. Meanwhile, the structure as shown in FIG. 1 basically forms one layer of patterns on a base substrate, and this is referred to as a G2 structure.

Specifically, in the case of the capacitive pattern 200 according to the embodiment of the prior art as shown in FIG. 1, there are a lot of sections 20a and 20b where the patterns 200x and 200y arranged in the X-axis and Y-axis directions cross each other while being insulated, and this is equally applied to the case of the sensing pattern 100.

Particularly, in the case of the sensing pattern 100, the pattern is extended in the shape of a loop to include a plurality of capacitive patterns 200 within the loop, and, at this point, a plurality of cross sections is created as a plurality of extended wires 1 of the sensing patterns 100 overlaps with each other in an outer area of the substrate.

However, if a large number of cross sections are generated as described above, there is a problem in that since a large amount of insulating materials are needed, and, at the same time, since the manufacturing process is complicated, the unit price of the touch panel increases, and throughput of the process is drastically lowered.

Furthermore, since a lot of patterns should be wired on one substrate, a substrate of a low change rate, i.e., a substrate using glass as a main material, should be used, and thus there is a problem of strictly limiting the types of available substrates.

Hereinafter, a touch panel according to an embodiment of the present invention will be described with reference to FIG. 2.

According to FIG. 2, a touch panel according to the present invention basically includes a plurality of sensing patterns 100y and an overlap area, and, at this point, the plurality of sensing patterns 100y is insulated and crosses each other only in the overlap area.

At this point, unlike the touch panel shown in FIG. 1, the touch panel according to the present invention is formed on the assumption that only a pattern of any one direction among the X-axis and the Y-axis directions is arranged on a layer, and if a pattern of a direction is implemented on each of two layer like this and a touch panel (of a GIFF structure) is manufactured by stacking these two layers, the process can be simplified, and thus the manufacturing cost can be lowered, and, at the same time, throughput of a finished product can be improved remarkably.

Meanwhile, unlike the prior invention, the touch panel of the present invention separately has an overlap area in which the wires extended from the plurality of sensing patterns 100 cross each other, and, particularly, the overlap area is provided in a certain area on a base substrate 2 or in a certain outer area the base substrate 2, and all the cross structures 30 of the sensing patterns 100 are implemented to cross only in the overlap area.

The overlap area may be positioned in a certain area on the substrate, i.e., in an active view area in which a display is implemented or in an outer area of the substrate, i.e., a bezel area, through which the wires extended from the capacitive patterns, the sensing patterns and the like pass through.

According to the present invention as described above, since the cross structures 30 inevitably created all over the substrate in the prior art are rendered to exist only in a specific area, the manufacturing process of the touch panel can be remarkably simplified, and, in addition, since it may be designed to place the cross structures 30 only on a substrate or in a specific area out of the substrate desired by a user, a lot of problems caused by the cross structures can be solved.

Meanwhile, an overlap substrate, i.e., a separate substrate for easily forming the cross structures 30 of the wires 1 extended and connected from the sensing patterns 100y, is provided in the overlap area so that a user may implement the cross structures of the sensing patterns 100y in a variety of forms.

For example, if via holes are drilled through an overlap substrate 300 as shown in FIG. 2(a) and the wire 1 extended from the sensing pattern 100 passes through the holes in the shape of π from the standpoint of the overlap substrate 300, the overlap substrate 300 functions as an insulator so that the sensing patterns 100 may form the cross structure 30 while being insulated from each other.

For another example of forming the cross structures 30, as shown in FIG. 2(b), it is possible to stack an insulation layer 500 on the overlap substrate 300, and the wires 1 extended from a plurality of sensing patterns 100 form cross structures by the insulation layer 500. That is, if the insulation layer 500 is stacked on the overlap substrate 300 and the cross structures 30 are formed using the insulation layer 500, a complicated process is not needed, and cost can be greatly lowered compared with that of forming the cross structures existing all over the substrate according to the prior art, and thus an embodiment of forming the cross structures 300 between the sensing patterns 100 on the overlap substrate 300 may be considered.

Meanwhile, in another embodiment according to the present invention, the layer or the base substrate 2 is preferably implemented using a general transparent substrate, including glass and a film.

Meanwhile, the pattern or an electrode as a terminology of the same meaning may include a transparent conductive material so that electricity may flow without hindering transmission of light. For example, the electrode may include metal oxide such as indium tin oxide, indium zinc oxide, copper oxide, tin oxide, zinc oxide, titanium oxide or the like. In addition, the electrode may include a nano-wire, a photo-sensitive nano-wire film, a carbon nano-tube (CNT), graphene, a conductive polymer, or a variety of metals. For example, the electrode may be formed of chrome (Cr), nickel (Ni), copper (Cu), aluminum (Al), silver (Ag), molybdenum (Mo) or an alloy of these.

In addition, the patterns formed in the view area or an active area may be formed using a transparent conductive material such as a Cu mesh, an Ag mesh or the like, including indium tin oxide (ITO). That is, the patterns formed of the materials described above may be effectively utilized to enhance visibility of a display by implementing the patterns in the shape of a mesh. Furthermore, the wires 1 extended from the patterns may be formed of a variety of materials including stacking type materials such as ITO, a Cu mesh, an Ag mesh, Cu, and Ag or metal nitride oxide.

Meanwhile, preferably, a Flexible Printed Circuit Board (FPCB) may be used as the overlap substrate 300. When the FPCB is used as the overlap substrate 300, an overlapped portion can be curved or bent by the elasticity owing to the nature of the FPCB, and thus the FPCB can be attached on either side of the substrate while being bent, and, therefore, an effect of securing the view area or the touch area to the maximum and minimizing the bezel area can be obtained.

FIG. 3 is a view showing an embodiment of positioning an overlap area in another area according to still another embodiment of the present invention.

As described above, the overlap area may be arranged in a certain area at an outer portion of the view area.

That is, the sensing pattern 100y is in a shape of a loop, and if only a condition of including a specific number of capacitive patterns 200y in one loop is satisfied, the overlap area or the overlap substrate 300 in which the cross structures 30 are formed may be arranged in a certain area other than the view area as long as the loop shape is maintained, and a user may select a position in the overlap area which can minimize the length of the wire 1 extended from the sensing pattern 100y using the freedom of design and, furthermore, may obtain technical effects according thereto.

Specifically, compared with FIG. 2, the arrangement method of FIG. 3 may minimize the length of the wire 1 extended from each sensing pattern 100y, and since resistance of the wire 1 can be reduced accordingly, loss of electrical signals passing through the pattern can be lowered.

Hereinafter, a touch panel structure stacking two layers will be described in detail with reference to FIGS. 4 and 5.

FIGS. 4(a) and 4(b) are views showing a structure stacking two layers according to an embodiment of the present invention.

As described above with reference to FIG. 2, the present invention assumes that only a pattern 100 or 200 of one direction among the X-axis and Y-axis directions is arranged on a layer. The touch panel shown in FIG. 4(a) is a structure stacking two layers on which the patterns 100 and 200 are respectively arranged in each direction like this, and in the present invention, a layer on which patterns 100x and 200x of the X-axis direction are arranged is expressed as a first layer 600, and a layer on which patterns 100y and 200y of the Y-axis direction are arranged is expressed as a second layer 800 for convenience.

On the other hand, according to FIG. 4(b), the layers are stacked on the top and bottom sides of an adhesive layer 700 with the intervention of the adhesive layer 700, and, at this point, preferably, the adhesive layer 700 may be an optically clear adhesive.

If the sensing patterns 100 are separately manufactured on different layers in different directions and then the layers are simply combined, insulation between the patterns can be effectively formed compared with the sensing patterns 100 arranged in both directions on a single layer as shown in FIG. 1, and since a completed touch panel can be obtained only by simply stacking the layers, an effect of greatly simplifying the process can be obtained.

On still the other hand, according to FIG. 4(a), it can be understood that the first layer 600 and the second layer 800 are separately provided with an overlap area in which cross structures of the sensing patterns 100 are formed.

In the case of the first layer 600, the overlap area or the overlap substrate 300 is arranged in the left side area of the substrate, and it may be implemented such that the wires 1 extended from the sensing patterns of the X-axis direction may form the cross structures 30 only within the area.

In the case of the second layer 800, the overlap area or the overlap substrate 300 is arranged in the right side area of the substrate, and it may be implemented such that the wires 1 extended from the sensing patterns of the Y-axis direction may form the cross structures 30 only within the area.

On the other hand, although it is shown in FIG. 4 that each layer separately has an overlap area or an overlap substrate 300, it may be implemented such that two layers share one overlap area or overlap substrate 300 to form an overlap structure of the patterns. For example, it may be implemented such that one overlap substrate is cut in the middle in the plane direction, and then patterns of the first layer are connected on one side of the overlap substrate, and patterns of the second layer are connected on the other side of the overlap substrate.

Meanwhile, the overlap substrate 300 may be implemented as a so-called integrated substrate 450 in a form combined with a driving substrate 400 which controls input and output of signals of the capacitive patterns 200 and the sensing patterns 100. That is, it may be designed such that a wire 1 connection unit for connecting the input and output of each of the capacitive patterns 200 and the sensing patterns 100 exists in the driving substrate 400, and, at the same time, an overlap area in which cross structures of the wires 1 extended from the sensing patterns 100 may be formed is arranged together in the driving substrate 400. FIG. 4 shows an embodiment in which total two substrates are provided in a completed touch panel by forming cross structures 30 of the first layer 600 on the separate overlap substrate 300 and cross structures 30 of the second layer 800 on the integrated substrate 450 combined with the driving substrate 400.

Meanwhile, FIG. 5 also shows a touch panel structure implemented by stacking two layers together with the adhesive layer 700, and only the position of the overlap substrate 300 in which the cross structures of the second layer are formed is changed compared with FIG. 4, and the other configurations are the same.

That is, the touch panel structure presented in FIG. 5 shows an embodiment implementing a touch panel using total three substrates by forming the cross structures of the first layer 600 and the second layer 800 on independent overlap substrates 300a and 300b separated from the driving substrate 400.

If an independent overlap substrate 300a or 300b is used for each layer as described above, the length and number of the wires extended into the outer portion of the view area can be reduced, and, in this case, resistance of the wires 1 can be lowered, in addition to reducing the width and size of the bezel, and thus an effect of minimizing electrical signal loss can be obtained.

FIG. 6 is a view illustrating an application example of a display apparatus including a touch panel according to the present invention.

The touch panel according to the present invention as described above is included in all kinds of display apparatuses having a touch function and may have a variety of application examples. Specifically, the touch panel according to the present invention can be provided in various kinds of display apparatuses which need a touch function, such as a mobile communication terminal including a smartphone, a PDA, a tablet or the like, a dashboard or a navigation terminal in a transportation means, a display terminal which can be installed indoor or outdoor, and the like.

FIG. 6 shows an exemplary view of a touch panel provided in a variety of display apparatuses as described above, and a view area 3 covering the sensing patterns and the capacitive patterns, and a bezel area 4 covering the wires connected to the patterns and the overlap substrate 300 are shown.

If a touch panel separately provided with an overlap area or an overlap substrate 300 is utilized, visibility in the view area 3 can be improved, and, at the same time, an effect of reducing the process and cost of manufacturing the display apparatus can be obtained.

A display apparatus of the present invention is described with reference to FIGS. 7 and 8. Referring to FIGS. 7 and 8, the display apparatus according to the present invention may include a display panel.

Specifically, at least one sensing pattern may be formed on at least one side of the display panel. The display panel includes a first substrate 21 and a second substrate 22. That is, at least one sensing pattern may be formed on at least one side of the first substrate 21 or the second substrate 22.

However, the first and second sensing patterns of FIGS. 7 and 8 may be any one of the sensing patterns and the capacitive patterns of the embodiment described above. For example, the first sensing pattern may be a sensing pattern, and the second sensing pattern may be a capacitive pattern.

When the display panel is a liquid crystal display panel, the display panel may be formed in a structure bonding the first substrate 21 including a thin film transistor (TFT) and a pixel electrode and the second substrate 22 including color filter layers with the intervention of a liquid crystal display layer.

In addition, the display panel may be a liquid crystal display panel of a color filter on transistor (COT) structure, in which a thin film transistor, a color filter and a black matrix are formed on the first substrate 21, and the second substrate 22 is bonded to the first substrate 21 with the intervention of the liquid crystal display layer. That is, it is possible to form a thin film transistor on the first substrate 21, a protection film on the thin film transistor, and a color filter layer on the protection film. In addition, a pixel electrode contacting with the thin film transistor is formed on the first substrate 21. At this point, it may be formed such that the black matrix is omitted to improve an aperture ratio and simplify the masking process, and a common electrode additionally functions as the black matrix.

In addition, when the display panel is a liquid crystal display panel, the display apparatus may further include a backlight unit for providing light from the rear side of the display panel.

When the display panel is an organic electroluminescent display panel, the display panel includes a self-emissive element which does not need a separate light source. In the display panel, a thin film transistor is formed on the first substrate 21, and an organic light emitting element contacting with the thin film transistor is formed. The organic light emitting element may include a positive electrode, a negative electrode, and an organic light emitting layer formed between the positive electrode and the negative electrode. In addition, the second substrate 22 functioning as an encapsulation substrate for encapsulation may be further included on the organic light emitting element.

At this point, at least one sensing pattern may be formed on the top surface of the substrate arranged at the upper position. Although it is shown in the figure that the sensing pattern is formed on the top surface of the second substrate 22, when the first substrate 21 is arranged at the upper position, at least one sensing pattern may be formed on the top surface of the first substrate 21.

Referring to FIG. 7, a first sensing pattern 100 may be formed on the top surface of the display panel. In addition, a first wire connected to the first sensing pattern 100 may be formed. A touch substrate 310 on which a second sensing pattern 200 and a second wire are formed may be formed on the display panel on which the sensing pattern 100 is formed. A first adhesive layer 700 may be formed between the touch substrate 310 and the display panel.

In the figure, although it is shown that the second sensing pattern 200 is formed on the top surface of the touch substrate 310, and a cover substrate 350 is arranged on the touch substrate 310 with the intervention of a second adhesive layer 710, it is not limited thereto. The second sensing pattern 200 may be formed on the rear surface of the touch substrate 310, and, at this point, the touch substrate 310 may perform the function of the cover substrate.

That is, it is not limited to the figure and is sufficient to have a structure in which the first sensing pattern 100 is formed on the top surface of the display panel, the touch substrate 310 for supporting the second sensing pattern 200 is arranged on the display panel, and the touch substrate 310 is bonded to the display panel.

In addition, the touch substrate 310 may be a polarizing plate. That is, the second sensing pattern 200 may be formed on the top surface or the rear surface of the polarizing plate. According to this, the second sensing pattern and the polarizing plate may be formed in one piece.

In addition, a polarizing plate may be further included in addition to the touch substrate 310. At this point, the polarizing plate may be arranged under the touch substrate 310. For example, the polarizing plate may be arranged between the touch substrate 310 and the display panel. In addition, the polarizing plate may be arranged on the top of the touch substrate 310.

The polarizing plate may be a linear polarizing plate or an external light anti-reflection polarizing plate. For example, when the display panel is a liquid crystal display panel, the polarizing plate may be a linear polarizing plate. In addition, when the display panel is an organic electroluminescent display panel, the polarizing plate may be an external light anti-reflection polarizing plate.

Referring to FIG. 8, the first sensing pattern 100 and the second sensing pattern 200 may be formed on the top surface of the display panel. In addition, a first wire connected to the first sensing pattern 100 and a second wire connected to the second sensing pattern 200 may be formed on the top surface of the display panel.

In addition, an insulation layer 500 for exposing the second sensing pattern 200 may be formed on the first sensing pattern 100. A bridge electrode 250 for connecting the second sensing pattern 200 may be further formed on the insulation layer 500.

However, it is not limited to the figure, and the first sensing pattern 100, the first wire and the second wire may be formed on the top surface of the display panel, and the insulation layer may be formed on the first sensing pattern 100 and the first wire. The second sensing pattern 200 may be formed on the insulation layer, and a connection unit for connecting the second sensing pattern 200 and the second wire may be further included.

In addition, the first sensing pattern 100, the second sensing pattern 200, the first wire and the second wire may be formed in an effective area on the top surface of the display panel. The first sensing pattern 100 and the second sensing pattern 200 are formed to be spaced apart from each other and may be arranged to be adjacent to each other. That is, the insulation layer, the bridge electrode or the like may be omitted.

That is, it is not limited to the figure and is sufficient to form the first sensing pattern 100 and the second sensing pattern 200 on the display panel without a separate sensing pattern support substrate.

A cover substrate 350 may be arranged on the display panel with the intervention of an adhesive layer 702. At this point, a polarizing plate may be arranged between the display panel and the cover substrate 350.

Next, a display apparatus according to another embodiment of the present invention will be described with reference to FIGS. 9 to 12. Descriptions overlapped with those of the embodiments described above may be omitted.

Referring to FIGS. 9 to 12, a display apparatus according to an embodiment of the present invention may include a display panel.

However, the first and second sensing patterns of FIGS. 9 to 12 may be any one of the sensing patterns and the capacitive patterns of the embodiments described above. For example, the first sensing pattern may be a sensing pattern, and the second sensing pattern may be a capacitive pattern.

A sensing pattern arranged in the effective area to perform a function of a sensor for sensing touch and a wire for applying electrical signals to the sensing pattern may be formed inside the display panel. Specifically, at least one sensing pattern and at least one wire may be formed inside the display panel.

The display panel includes a first substrate 21 and a second substrate 22. At this point, at least one sensing pattern among a first sensing pattern 100 and a second sensing pattern 200 is arranged between the first substrate 21 and the second substrate 22. That is, at least one sensing pattern may be formed on at least one side of the first substrate 21 or the second substrate 22.

Referring to FIGS. 9 to 11, a first sensing pattern 100, a second sensing pattern 200, a first wire and a second wire may be arranged between the first substrate 21 and the second substrate 22. That is, the first sensing pattern 100, the second sensing pattern 200, the first wire and the second wire may be arranged inside the display panel.

Referring to FIG. 9, the first sensing pattern 100 and the first wire may be formed on the top surface of the first substrate 21 of the display panel, and the second sensing pattern 200 and the second wire may be formed on the rear surface of the second substrate 22. Referring to FIG. 10, the first sensing pattern 100, the second sensing pattern 200, the first wire and the second wire may be formed on the top surface of the first substrate 21. An insulation layer 520 may be formed between the first sensing pattern 100 and the second sensing pattern 200. In addition, referring to FIG. 11, the first sensing pattern 100 and the second sensing pattern 200 may be formed on the rear surface of the second substrate 22. An insulation layer 530 may be formed between the first sensing pattern 100 and the second sensing pattern 200.

Referring to FIG. 12, the first sensing pattern 100 and the first wire may be formed between the first substrate 21 and the second substrate 22. In addition, the second sensing pattern 200 and the second wire may be formed on a touch substrate 320. The touch substrate 320 may be arranged on the display panel including the first substrate 21 and the second substrate 22. That is, the first sensing pattern 100 and the first wire may be arranged inside the display panel, and the second sensing pattern 200 and the second wire may be arranged outside the display panel.

The first sensing pattern 100 and the first wire may be formed on the top surface of the first substrate 21 or the rear surface of the second substrate 22. In addition, an adhesive layer may be formed between the touch substrate 320 and the display panel. At this point, the touch substrate 310 may perform the function of the cover substrate.

Although a configuration in which the second sensing pattern 200 is formed on the rear surface of the touch substrate 320 is shown in the figure, it is not limited thereto. The second sensing pattern 200 may be formed on the top surface of the touch substrate 320, and a cover substrate arranged on the touch substrate 320 with the intervention of an adhesive layer may be further formed.

That is, it is not limited to the figure and is sufficient to have a structure in which the first sensing pattern 100 and the first wire are arranged inside the display panel, and the second sensing pattern 200 and the second wire are arranged outside the display panel.

In addition, the touch substrate 320 may be a polarizing plate. That is, the second sensing pattern 200 may be formed on the top surface or the rear surface of the polarizing plate. According to this, the second sensing pattern and the polarizing plate may be formed in one piece.

In addition, a polarizing plate may be further included without regard to the touch substrate 320. At this point, the polarizing plate may be arranged under the touch substrate 320. For example, the polarizing plate may be arranged between the touch substrate 320 and the display panel. In addition, the polarizing plate may be arranged on the top of the touch substrate 320.

When the display panel is a liquid crystal display panel and the sensing pattern is formed on the top surface of the first substrate 21, the sensing pattern may be formed together with a thin film transistor or a pixel electrode. In addition, when the sensing pattern is formed on the rear surface of the second substrate 22, a color filter layer may be formed on the sensing pattern, or the sensing pattern may be formed on the color filter layer. When the display panel is an organic electroluminescent display panel and the sensing patter is formed on the top surface of the first substrate 21, the sensing pattern may be formed together with a thin film transistor or an organic light emitting element.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A touch panel comprising:
a substrate divided into a view area and a bezel area;
a plurality of sensing patterns formed on the view area of the substrate and configured to sense a touch signal associated with an induced electromagnetic force generated from a touch pen;
a plurality of capacitive patterns formed in the view area of the substrate and configured to sense a capacitive input signal;
first wires extending respectively between a driving substrate and of the plurality of sensing patterns or the plurality of capacitive patterns;
second wires that extend between the plurality of sensing patterns; and
an overlap area in which the second wires extended between the plurality of sensing patterns cross each other, the overlap area being formed in the bezel area of the substrate or an area outside the substrate,
wherein:
the plurality of sensing patterns and the plurality of capacitive patterns are both formed in mesh shapes,
the plurality of sensing patterns are formed to surround the plurality of capacitive patterns in one same layer,
a width of the plurality of sensing pattern is narrower than a width of the plurality of capacitive pattern, and
the second wires extended between the plurality of sensing patterns are insulated and cross each other only in the overlap area.

2. The touch panel according to claim 1, wherein an overlap substrate is formed in the overlap area, and the second wires extended between the plurality of sensing patterns are insulated and cross each other through via holes formed in the overlap substrate.

3. The touch panel according to claim 2, wherein the overlap substrate is flexible printed circuit board (FPCB).

4. The touch panel according to claim 1, wherein an overlap substrate on which an insulation layer is stacked is formed in the overlap area, and the second wires extended between the plurality of sensing patterns are insulated and cross each other through the insulation layer.

5. The touch panel according to claim 1, wherein the plurality of sensing patterns is formed using a same material as that of a resistive film pattern or the plurality of capacitive patterns.

6. The touch panel according to claim 1, wherein a width of the overlap area is smaller than a half of a width of the view area at a side at which the overlap area is located.

7. The touch panel according to claim 1, wherein the overlap area is formed in an overlap substrate located outside the substrate.

8. A display apparatus comprising a display panel and a touch panel, the touch panel including:
   a substrate divided into a view area and a bezel area;
   a plurality of sensing patterns formed on the view area of the substrate and configured to sense a touch signal associated with an induced electromagnetic force generated from a touch pen;
   a plurality of capacitive patterns formed in the view area of the substrate and configured to sense a capacitive input signal;
   first wires extending respectively between a driving substrate and of the plurality of sensing patterns or the plurality of capacitive patterns;
   second wires that extend between the plurality of sensing patterns; and
   an overlap area in which the second wires extended between the plurality of sensing patterns cross each other, the overlap area being formed in the bezel area of the substrate or an area outside the substrate,
   wherein:
      the plurality of sensing patterns and the plurality of capacitive patterns are both formed in mesh shapes,
      the plurality of sensing patterns are formed to surround the plurality of capacitive patterns in one same layer,
      a width of the plurality of sensing pattern is narrower than a width of the plurality of capacitive pattern, and
      the second wires extended between the plurality of sensing patterns are insulated and cross each other only in the overlap area.

9. The display apparatus according to claim 8, wherein a width of the overlap area is smaller than a half of a width of the view area at a side at which the overlap area is located.

10. The display apparatus according to claim 8, wherein the overlap area is formed in an overlap substrate located outside the substrate.

* * * * *